Jan. 22, 1935.　　　　　S. S. SMITH　　　　　1,988,704

PROCESS OF RECTIFICATION

Filed Jan. 8, 1932　　　2 Sheets-Sheet 1

Jan. 22, 1935.  S. S. SMITH  1,988,704
PROCESS OF RECTIFICATION
Filed Jan. 8, 1932  2 Sheets-Sheet 2
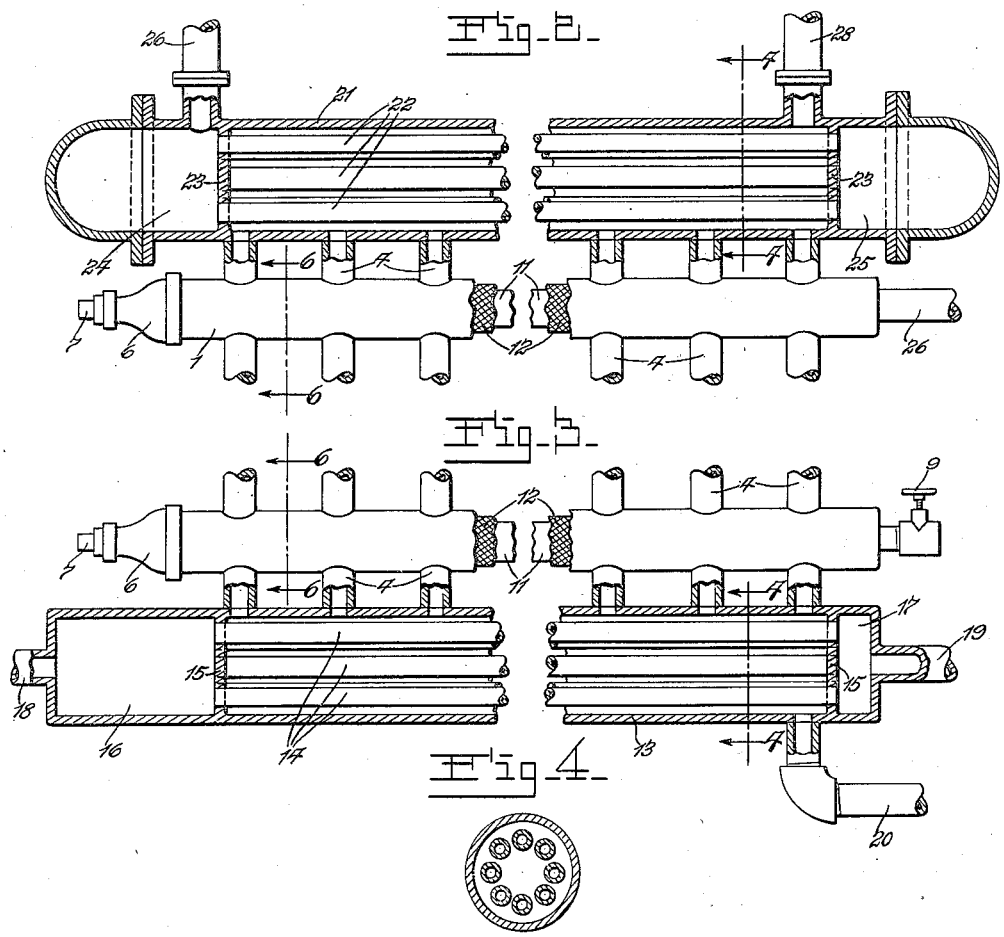
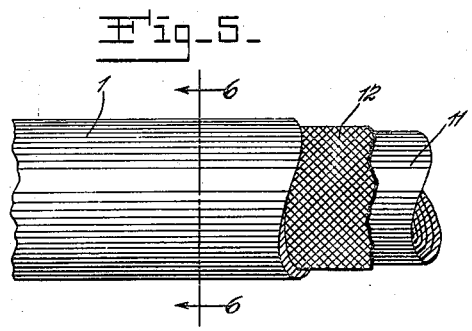
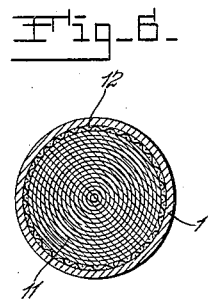
Inventor
Sydney S. Smith
by Rippey & Kingsland
His Attorneys.

UNITED STATES PATENT OFFICE 1,988,704

PROCESS OF RECTIFICATION

Sydney S. Smith, Tulsa, Okla., assignor, by mesne assignments, to Shell Development Company, San Francisco, Calif., a corporation of Delaware Application January 8, 1932, Serial No. 585,445

8 Claims. (Cl. 202—40)

This invention relates to distillation and more particularly to a method for fractional distillation by rectification of composite liquids comprising components having different boiling points.

The general object of the invention is to provide a method for continuous fractional distillation of volatile liquids which is accurate, efficient, economical in operation and simple in practice.

A more specific object of the invention is to provide a method for effecting a sharp cut between the fractions of a liquid which includes volatile fractions having different boiling points whereby a separation of the various fractions may be made and selected products withdrawn in substantially a pure state.

The process includes passing a fluid to be rectified progressively through a series of columns in which the throughput will be stratified and the boiling range in each strata will progressively decrease. A plurality of columns are provided in lateral communication one with the other at a plurality of planes, thus providing a path for the fluid in vapor form to pass progressively from one column to another in its appropriate zone. In each successive column the range of reflux will be gradually decreased, that is, the vertical movement of a particular molecule will be lessened in its passage through the different columns of the system. In each succeeding column the separation tends to become more accurate and, thus by providing a sufficient number of columns, substantially accurate separation may be made and a particular product withdrawn in its pure state. The process may be best described by a description of typical apparatus suitable for practicing the method.

The apparatus here specifically illustrated, is described and claimed in my Patent No. 1,904,334. The apparatus selected as typical and illustrated in the drawings comprises generally a series of horizontal cylindrical plates arranged in a vertical plane; a kettle at the bottom; a condenser at the top; a number of series of vertical connections between the kettle, plates and condenser, each series of connections being arranged in a vertical line and arranged to permit from any section of a plate downward flow only in the liquid phase, and horizontal and upward flow in the vapor phase; means for introducing the input on a series of plates at one end; means for withdrawing the liquid component at the bottom, the final and vapor component at the top, and intermediate components in the vapor phase at intermediate plates, the withrawal taking place at the end opposite the end receiving the input; and means for automatically regulating the temperatures by controlling the flow of the heating fluid through the kettle and the cooling fluids through the condenser.

Fig. 2 is a detail drawing partly in section of the upper part of the apparatus including the condenser.

Fig. 3 is a detail view partly in section of the lower part of the apparatus including the kettle.

Fig. 4 is a cross-section through either the condenser or the kettle on lines 4—4, Fig. 2 or Fig. 3.

Fig. 5 is a detail view of a plate showing the core construction.

Fig. 6 is a cross-section through a plate on lines 6—6, Fig. 2, Fig. 3 or Fig. 5.

Figure 1:
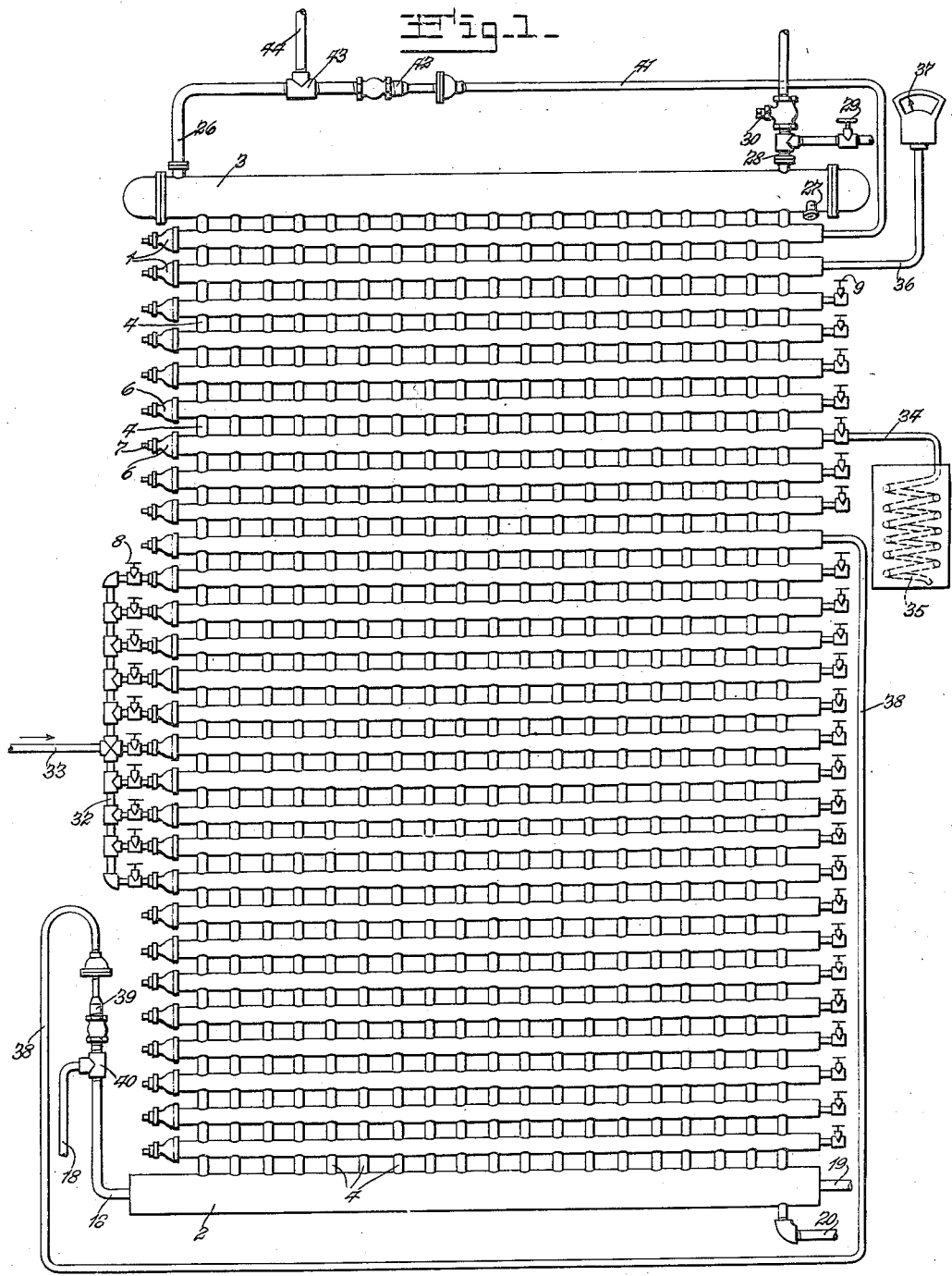
Fig. 1 is a side view of the apparatus partly diagrammatical.

The plate assembly comprises a series of condenser plates 1 in the form of cylindrical tubes each horizontally disposed and arranged in a vertical plane and equally spaced one from the other. The kettle 2 is mounted at the bottom and a condenser 3 is mounted at the top of the plate assembly. The kettle, plates and condenser are connected by a number of series of vertical tubes 4, each of the tubes in a series being in vertical alignment. The tubes 4 may be attached to the plates 1, the kettle 2 and the condenser 3 by welding.

The left end of the apparatus may for convenience be designated the receiving side and the right end the delivery side.

Each of the plates 1 has at the receiving side a reducer head 6 in which may be fitted a plug 7 or a valve 8. On the delivery side it may be provided with a valve 9 for withdrawal of a component in the vapor phase either for purpose of sampling, or condensation and storage. Each plate 1 has a core in order to increase the contact surface and such a core may be constructed of a tight roll of expanded metal lath 11 wrapped with hardware cloth 12.

The kettle 2 includes a shell 13 to which is attached the vertical tubes or risers 4. A series of tubes 14 are situated within the shell 13 and are connected at each end to a header plate 15, thus providing manifold chambers 16 and 17. A connection 18 leads into the chamber 16 providing communication for the introduction of steam and the condensate is withdrawn through the chamber 17 by a connection 19. A connection 20 is provided in the delivery side of the kettle for the withdrawal of the final liquid component.

The condenser 3 is constructed in a manner similar to the construction of the kettle. A shell 21 is connected by the tubes 4 to the plate assembly. A series of horizontal tubes 22 are connected at each end to a header plate 23 providing chambers 24 and 25. A connection 26 is made with the chamber 24 for the introduction of a cooling fluid such as water and a connection 27 is made with the chamber 25 for the withdrawal of the spent fluid. A connection 28 is made with the shell 21 for the withdrawal of the final end vapor component and a manually controlled valve 29 may be interposed in a pipe leading from the connection 28 for the control of the flow of the end vapor component. A safety pressure valve 30 in communication with the connection 28 may be ordinarily used for the discharge of the vapor component.

A manifold 32 is connected to a series of plates 1 through the valves 8 and has connected to it a pipe 33 to receive the input.

Intermediate vapor components may be taken off of any one of the plates 1 through its valve 9 and a pipe 34 leading to a condenser coil 35.

A tube 36 may be connected to any of the plates 1 and leads to a temperature recorder or indicator 37.

The temperature and the operation of the rectifier may be controlled by automatically regulating the flow of steam through the kettle and the flow of water through the condenser. The steam regulating mechanism may comprise a tube 38 connected to a plate 1, a thermostat 39 and a steam valve 40 on the pipe 18. The water regulating mechanism may comprise a pipe 41 leading from a plate 1, a thermostat 42, and a valve 43 between a water supply pipe 44 and the connection 26.

The feed may be entered on the receiving side through the manifold 32 to a series of plates 1. A liquid level is maintained within the kettle at a height sufficient to give complete submergence of the tubes 14 in the liquid. This control may be accomplished manually or by a float control, not shown, but which may be of a type well known in the industry. The pressure may be controlled by vapor removal through the pressure valve 30 or manual valve 29. Temperatures at the condenser and kettle may be controlled by the thermostatic apparatus illustrated and described.

The principle of operation of this rectifier may be explained by comparison with other types of rectifying columns. In the operation of a continuous process column, the temperature gradient and the composition gradient are distorted by the throughput or take-off of the components; and the action of the column and the accuracy of separation between individual components is quite different when the column is shut in and no component is being removed, from conditions when there is a throughput. The accurate fractionation obtained while a column is shut in is obtained by the infinite reflux.

By the use of this process results approaching in accuracy those inherent in a shut-in column are obtained with the additional advantages inherent in a continuous flow process.

It will be observed that the vertical tubes 4 in reality comprise a number of vertical columns, nineteen as illustrated, while the plates, including the kettle and the condenser, number thirty. For convenience of description we may number these columns from left to right; or from the receiving side, one to nineteen; and the plates from bottom to top, one to thirty.

For example, as illustrating the operation of the device, it may be assumed that it is desired to operate the rectifier as a stabilizer for natural gasoline being fed to plates ten to eighteen, adjacent column one; and that end products are to be taken off adjacent column nineteen, propane at plate thirty, butane at plate twenty-three, and the residue at plate one, as shown in the drawings.

A molecule of butane introduced adjacent column one on plates ten to eighteen traverses a tortuous course, moving in its liquid phase downward in any of the several columns and in its vapor phase upward and horizontal. The construction and operation of the apparatus will be such as to confine it at column nineteen between the eighteenth and twenty-eighth plate. The molecule will, during its tortuous course, tend to confine itself between those plates. At or about the twelfth column the individual components will be roughly separated but not with such accuracy as to confine the molecule of butane within the selected plates. Its range of movement between the plates will be progressively decreased until it reaches the nineteenth plate where it may be taken off accurately at the twenty-third plate.

It is to be understood that the foregoing discussion is merely illustrative of the theory of operation. Butane, a single hydrocarbon, has been selected as an illustration of an intermediate fraction merely for simplicity of explanation, but such a cut would ordinarily include a group of hydrocarbons having a limited boiling range rather than a single compound. The operation of the method has been described hypothetically in connection with the rectification of natural gasoline. By comparison, were the method used to distill relatively heavy oil, for instance, gasoline and lighter fractions might be taken off as a final end vapor product, kerosene as an intermediate product in its vapor phase after it has traversed a course similar to that just described in connection with butane in the other illustration, and the residue would be taken off as a final liquid product.

It will be apparent that the method may be practiced with apparatus having wide differences in forms and this invention is not limited to the practice of the process in connection with the particular apparatus described. The theory of operation, as above described, includes the flowing of a fluid through a plurality of columns. It will be apparent that the apparatus may be considered as a single column having a plurality of zones in different vertical planes.

It will also be apparent that the apparatus may be considered as merely a series of baffled passageways. A consideration of the functions of the apparatus here described in detail make it further apparent that apparatus differing widely in form may be successfully used to perform the functions intended in the practicing of this process.

It will be seen that the temperature gradient and the composition gradient, at least in the final zones of operation, are affected but little by the throughput and an accuracy is obtained approaching that in the use of a shut-in column. At the same time apparatus may be employed which compares favorably in cost of construction and operation with less accurate continuous rectifiers.

While the method has been described as applicable to the stabilization of petroleum products, its application may be extended to a wide range of uses with accuracy of results and economy in operation.

It is obvious that various changes may be made in the method described, within the scope of the appended claims, without departing from the spirit of this invention.

I claim:

1. The method of rectification which includes passing a fluid through baffled passageways laterally and vertically under a constant pressure causing lateral movement substantially in one direction only, maintaining temperature gradients by applying heat at the bottom and extracting heat at the top, progressively decreasing the range of the reflux of each component along the lateral passageways, and removing the separated components at a vertical plane distant from the input.

2. The method of rectification which includes passing a fluid through a series of adjacent columns maintained in progressive communication one with the other at the top, bottom and intermediate levels, extracting heat at the top of the columns, applying heat at the bottom of the columns, and withdrawing the components at the final end column.

3. The method of rectification which includes passing a fluid through a series of columns in progressive communication one with the other at the top, bottom and intermediate levels, extracting heat at the top of the columns automatically in accordance with the temperature at an intermediate level in one of the columns, applying heat at the bottom of the columns, and withdrawing components at the final end column.

4. The method of rectification which includes passing a fluid through a series of columns in progressive communication one with the other at the top, bottom and intermediate levels, extracting heat at the top of the columns, applying heat at the bottom of the columns automatically in accordance with the temperature at an intermediate level of one of the columns, and withdrawing the components at the final end column.

5. The method of rectification which includes passing a fluid through a series of columns in progressive communication one with the other at their tops, bottoms, and intermediate levels, extracting heat at the top of the columns, applying heat at the bottom of the columns, maintaining a substantially constant pressure in the system, and withdrawing the components at the final end column.

6. The method of rectification which includes passing a fluid through a series of columns in progressive communication one with the other at their tops, bottoms and intermediate levels, extracting heat at the top of the columns, applying heat at the bottom of the columns withdrawing the final end vapor component at the top of the final end column, withdrawing the final liquid component at the bottom of the final end column, and withdrawing an intermediate vapor component at an intermediate level of the said end column.

7. The method of rectification which includes passing a fluid through a series of columns in progressive communication one with the other at their tops, bottoms and intermediate levels, extracting heat at the top of the columns atuomatically in accordance with the temperature and at an intermediate level in one of the columns, applying heat at the bottom of the columns automatically in accordance with the temperature at an intermediate level in one of the columns, maintaining a substantially constant pressure in the columns, withdrawing the final end vapor component at the top of the columns adjacent the final end column, withdrawing the liquid component at the bottom of the columns adjacent the final end column, and withdrawing an intermediate vapor component from an intermediate level of the end column.

8. The method of rectification which includes introducing a fluid to be rectified into a column, conducting the vapor components in said column laterally therefrom progressively into a series of adjacent columns having progressive communication one with the other and with said first named column at the tops, bottoms and plurality of intermediate levels thereof, extracting heat at the top of the columns, introducing heat at the bottom of the columns, and withdrawing the components at the last of said columns.

SYDNEY S. SMITH.